(12) United States Patent
Taya (10) Patent No.: US 9,337,605 B2
(45) Date of Patent: May 10, 2016

(54) OPTICAL AMPLIFICATION COMPONENT AND FIBER LASER DEVICE

(71) Applicant: FUJIKURA LTD., Tokyo (JP)

(72) Inventor: Hiroyuki Taya, Sakura (JP)

(73) Assignee: FUJIKURA LTD., Tokyo (JP)

( * ) Notice: Subject to any disclaimer, the term of this patent is extended or adjusted under 35 U.S.C. 154(b) by 163 days.

(21) Appl. No.: 14/188,827

(22) Filed: Feb. 25, 2014

(65) Prior Publication Data

US 2014/0240818 A1 Aug. 28, 2014

(30) Foreign Application Priority Data

Feb. 27, 2013 (JP) .................................. 2013-037727

(51) Int. Cl.
*H01S 3/00* (2006.01)
*H01S 3/04* (2006.01)
*H01S 3/067* (2006.01)
*H01S 3/0941* (2006.01)

(52) U.S. Cl.
CPC ........... *H01S 3/0405* (2013.01); *H01S 3/06704* (2013.01); *H01S 3/06754* (2013.01); *H01S 3/09415* (2013.01)

(58) Field of Classification Search
CPC ... H01S 3/042; H01S 3/0405; H01S 3/06704; H01S 3/06754; H01S 3/09415
USPC ................................................ 359/341.1, 337
See application file for complete search history.

(56) References Cited

U.S. PATENT DOCUMENTS

| 6,879,604 B2* | 4/2005 | Cook ..................... H01S 3/067 372/3 |
| 6,970,650 B2* | 11/2005 | Kajiya ............... H04B 10/2503 359/334 |
| 2001/0021300 A1* | 9/2001 | Yoshida .............. H01S 3/06704 385/134 |
| 2008/0198880 A1* | 8/2008 | Munroe .............. H01S 3/06704 372/6 |

FOREIGN PATENT DOCUMENTS

JP 2010-177553 A 8/2010

* cited by examiner

*Primary Examiner* — Mark Hellner
(74) *Attorney, Agent, or Firm* — Westerman, Hattori, Daniels & Adrian, LLP (57) ABSTRACT

An optical amplification component 1 includes a heat dissipation plate 10 and an amplification optical fiber 20 arranged on the heat dissipation plate 10. A first fiber portion 20A extending from a reference position RP between a first end E1 and a second end E2 of the amplification optical fiber 20 toward the first end E1 and a second fiber portion 20B extending from the reference position RP toward the second end E2 are wound in a spiral around the reference position RP so as to be along each other as well as not to overlap with each other, and the distance between the first fiber portion 20A and the second fiber portion 20B increases toward the ends thereof.

16 Claims, 8 Drawing Sheets

OPTICAL AMPLIFICATION COMPONENT AND FIBER LASER DEVICE

BACKGROUND OF THE INVENTION

The present invention relates to an optical amplification component and a fiber laser device suitable for dissipating heat from an amplification optical fiber.

A part of pumping light that propagates through an amplification optical fiber is transformed into heat due to transmission loss in the amplification optical fiber. Further, heat is also generated when an active element which is added to a core of the amplification optical fiber is pumped by the pumping light, and light is thereby emitted from the active element. The amplification optical fiber tends to be short-lived due to such heat. This tendency has become stronger along with a recent request for realizing a high-output fiber laser device.

Japanese Unexamined Patent Application Publication No. 2010-177553 discloses a technique for fixing an amplification optical fiber to a heat dissipation plate. It would appear that heat generation in the amplification optical fiber can be reduced by using this technique.

SUMMARY OF THE INVENTION

However, in Japanese Unexamined Patent Application Publication No. 2010-177553, deterioration caused by heat generation is likely to disadvantageously occur in a part of the amplification optical fiber, the part not being arranged on the heat dissipation plate.

Therefore, the present invention is directed to provide an optical amplification component and a fiber laser device capable of improving the life of an amplification optical fiber.

As a result of intensive studies to solve the above problems, the present inventors have found that, when pumping light enters an amplification optical fiber from both ends thereof, heat generation is distributed such that the amount of heat generation is largest at the ends of the amplification optical fiber, and decreases toward the center thereof.

Therefore, how to arrange the entire amplification optical fiber having such a heat generation amount distribution on a heat dissipation plate has become a new problem, and further intensive studies have been made on the new problem to achieve the present invention.

An optical amplification component of an embodiment of the present invention includes a heat dissipation plate and an amplification optical fiber arranged on the heat dissipation plate. A first fiber portion extending from a reference position between a first end and a second end of the amplification optical fiber toward the first end and a second fiber portion extending from the reference position toward the second end are wound in a spiral around the reference position so as to be along each other as well as not to overlap with each other, and the distance between the first fiber portion and the second fiber portion increases toward the ends thereof.

In such a configuration, the both ends of the amplification optical fiber at which the amount of heat generation is largest are located away from each other. Therefore, deterioration of the amplification optical fiber, the deterioration being caused by heat generated at the both ends thereof, can be significantly reduced. In this manner, the optical amplification component capable of improving the life of the amplification optical fiber is achieved.

Further, when the first fiber portion and the second fiber portion are considered as a pair, it is preferable that an outer pair and an inner pair in a wound state are separated from each other.

When the outer pair and the inner pair are separated from each other in this manner, a gap is formed throughout the circumferences of the both ends of the amplification optical fiber at which the amount of heat generation is largest in comparison with the case where the outer pair and the inner pair are in contact with each other. As a result, deterioration of the amplification optical fiber, the deterioration being caused by heat generated at the both ends thereof, can be further significantly reduced.

Further, it is preferable that the distance between the outer pair and the inner pair increases toward the ends of the first fiber portion and the second fiber portion.

In such a configuration, the gap formed around the both ends of the amplification optical fiber at which the amount of heat generation is largest can be made larger. As a result, deterioration of the amplification optical fiber, the deterioration being caused by heat generated at the both ends thereof, can be significantly reduced.

Further, it is preferable that an end part of the first fiber portion and an end part of the second fiber portion are opposed to each other across the reference position.

In such a configuration, the both ends of the amplification optical fiber at which the amount of heat generation is largest can be symmetrically arranged with respect to the reference position, thereby further increasing the distance between the both ends. Therefore, deterioration of the both ends of the amplification optical fiber and the vicinities thereof, the deterioration being caused by heat generated at the both ends of the amplification optical fiber, can be further significantly reduced.

Further, it is preferred that the heat dissipation plate include a first heat dissipation area and a second heat dissipation area having a smaller thermal resistance than the thermal resistance of the first heat dissipation area, and the end part of the first fiber portion and the end part of the second fiber portion be arranged in the second heat dissipation area.

In such a configuration, it is possible to intensively cool the both ends of the amplification optical fiber at which the amount of heat generation is largest. Therefore, it is possible to reduce deterioration of the amplification optical fiber while more downsizing the optical amplification component than an optical amplification component in which the amplification optical fiber is arranged on the heat dissipation plate that has substantially the same thermal resistance throughout the entire heat dissipation surface.

According to the present invention, there is provided a fiber laser device including: the optical amplification component described above; a seed light source; a first pumping light source; a second pumping light source; an input side optical coupler inputting seed light emitted from the seed light source to a core of the amplification optical fiber at the first end of the amplification optical fiber and inputting pumping light emitted from the first pumping light source to a cladding of the amplification optical fiber at the first end of the amplification optical fiber; and an output side optical coupler inputting pumping light emitted from the second pumping light source to the second end of the amplification optical fiber and outputting seed light propagating through the core of the amplification optical fiber to the outside.

According to the present invention, there is provided a fiber laser device including: the optical amplification component described above; a first pumping light source; a second pumping light source; an input side optical coupler inputting pumping light emitted from the first pumping light source to a cladding of the amplification optical fiber at the first end of the amplification optical fiber; an output side optical coupler inputting pumping light emitted from the second pumping light source to the second end of the amplification optical fiber; a first mirror reflecting at least a part of light emitted from an active element added to a core of the amplification optical fiber; and a second mirror reflecting light reflected by the first mirror with a lower reflectivity than the first mirror.

Also when the above optical amplification component is used as one of the components of such a fiber laser device, deterioration of the amplification optical fiber, the deterioration being caused by heat generated at the both ends thereof, can be significantly reduced. In this manner, the fiber laser device capable of improving the life of the amplification optical fiber is achieved.

As described above, the present invention can provide the optical amplification component and the fiber laser device capable of improving the life of the amplification optical fiber.

DETAILED DESCRIPTION OF THE INVENTION

Hereinbelow, embodiments of the present invention will be described in detail with reference to the accompanying drawings.

(1) First Embodiment

Figure 1:
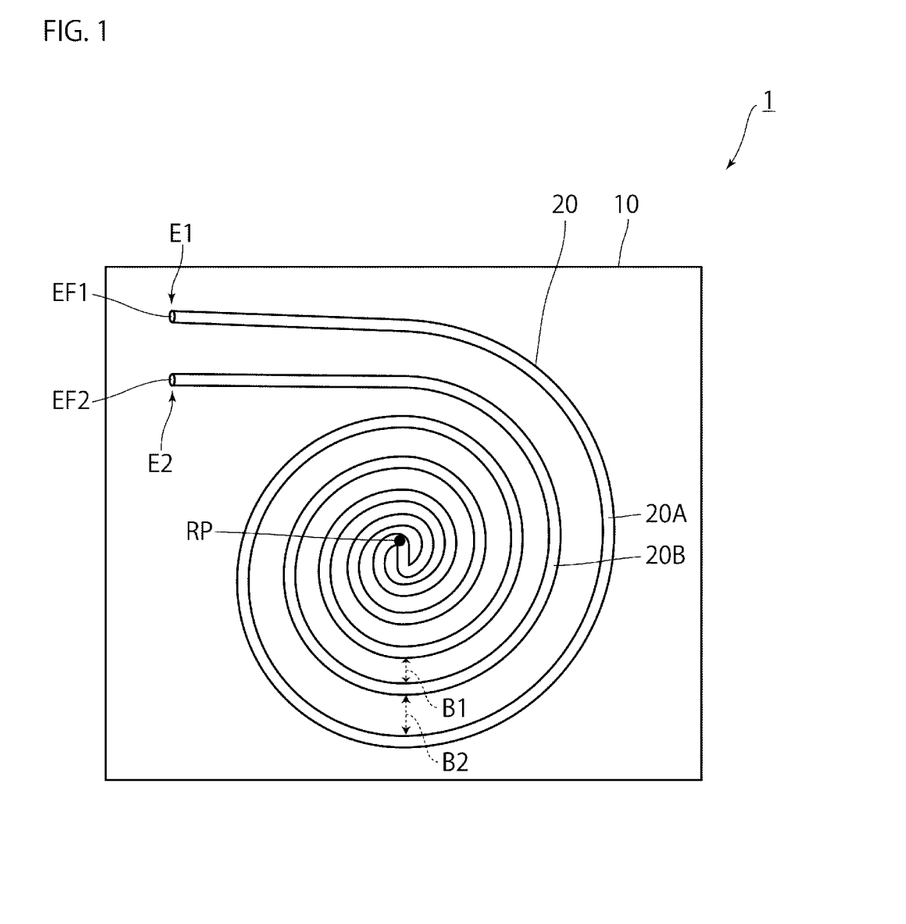
FIG. 1 is a diagram illustrating an optical amplification component in a first embodiment.

FIG. 1 is a diagram illustrating an optical amplification component 1 in the first embodiment. As illustrated in FIG. 1, the optical amplification component 1 of the present embodiment includes, as main components, a heat dissipation plate 10 and an amplification optical fiber 20 which is fixed to a heat dissipation surface of the heat dissipation plate 10.

The heat dissipation plate 10 is a plate member for reducing temperature by dissipating heat. The material of the heat dissipation plate 10 is metal such as silver, copper, gold, and aluminum, or an alloy thereof. The heat dissipation plate 10 has, for example, a rectangular parallelepiped shape.

Figure 2:
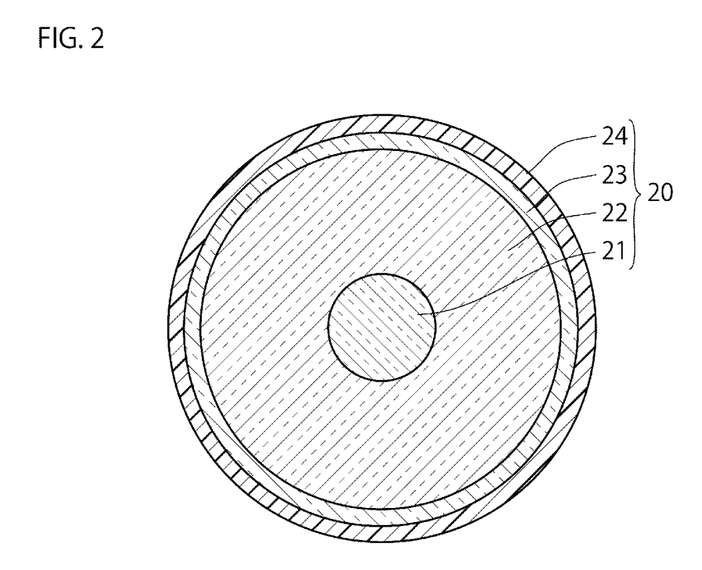
FIG. 2 is a diagram illustrating the cross section of an amplification optical fiber, the cross section being perpendicular to the length direction thereof.

FIG. 2 is a diagram illustrating the cross section of the amplification optical fiber 20, the cross section being perpendicular to the length direction thereof. As illustrated in FIG. 2, the amplification optical fiber 20 includes a core 21 to which one or more kinds of active elements are added, a first cladding 22 which covers the outer peripheral surface of the core 21, a second cladding 23 which covers the outer peripheral surface of the first cladding 22, and a cover layer 24 which surrounds the second cladding 23.

The refractive index of the core 21 is higher than the refractive index of the first cladding 22. The refractive index of the first cladding 22 is higher than the refractive index of the second cladding 23. The refractive index of the second cladding 23 is lower than the refractive index of the cover layer 24.

Examples of the active element include a rare earth element such as erbium (Er), ytterbium (Yb) and neodymium (Nd) and an active element other than a rare earth element such as bismuth (Bi).

In the present embodiment, a first fiber portion 20A which extends from a reference position RP between a first end E1 and a second end E2 of the amplification optical fiber 20 toward the first end E1 and a second fiber portion 20B which extends from the reference position RP toward the second end E2 are wound in a spiral around the reference position RP.

Specifically, the first fiber portion 20A and the second fiber portion 20B are bent at the reference position RP as a base point, and wound in a spiral around the reference position RP toward an outside of the reference position RP so as to be along each other as well as not to overlap with each other.

The reference position RP is reference for assigning the first fiber portion 20A and the second fiber portion 20B. The reference position RP is, for example, defined as the center of the amplification optical fiber 20 in the length direction thereof. The reference position RP may be defined as a position shifted from the center of the amplification optical fiber 20 in the length direction thereof toward the first end E1 or the second end E2. Further, although the first fiber portion 20A and the second fiber portion 20B are wound in a circular spiral in the example shown in FIG. 1, the first fiber portion 20A and the second fiber portion 20B can be wound in various forms. Further, although the first fiber portion 20A and the second fiber portion 20B are wound in a spiral in the counterclockwise direction, the first fiber portion 20A and the second fiber portion 20B may be wound in a spiral in the clockwise direction.

In the present embodiment, a fiber distance B2 between the first fiber portion 20A and the second fiber portion 20B increases toward the ends thereof. In the same manner as in the fiber distance B2, a winding turn distance B1 also increases toward the ends of the first fiber portion 20A and the second fiber portion 20B.

When the first fiber portion 20A and the second fiber portion 20B which are bent at the reference position RP as a base point and wound in a spiral around the reference position RP along each other are considered as a pair, the winding turn distance B1 indicates a distance between an outer pair and an inner pair in a wound state. The fiber distance B2 indicates a distance between the first fiber portion 20A and the second fiber portion 20B which form a pair.

Pumping light enters the first cladding 22 at the first end face EF1 and the second end face EF2 of the amplification optical fiber 20.

When pumping light enters the first cladding 22, the pumping light propagates through the first cladding 22 and the core 21 of the amplification optical fiber 20. The active element which is added to the core 21 is pumped by the pumping light, and light having a specific wavelength is thereby emitted from the active element.

As describe above, when light is emitted from the active element which is added to the core 21 of the amplification optical fiber 20, heat is generated. Further, a part of the pumping light that propagates through the amplification optical fiber 20 is transformed into heat due to transmission loss in the amplification optical fiber 20.

Figure 3:
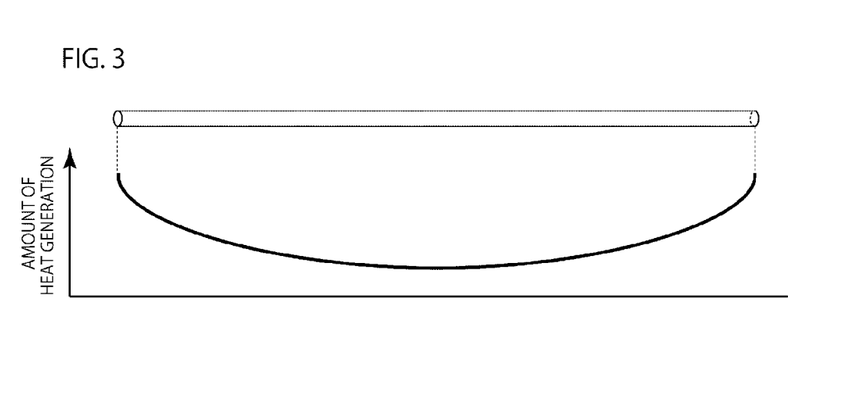
FIG. 3 is a diagram illustrating the distribution of the amount of heat generation of the amplification optical fiber when pumping light enters the amplification optical fiber from both ends thereof.

FIG. 3 is a diagram illustrating the distribution of the amount of heat generation of the amplification optical fiber 20 when pumping light enters the amplification optical fiber 20 from the both ends thereof. As illustrated in FIG. 3, when pumping light enters the amplification optical fiber 20 from the both ends thereof, heat generation is distributed such that the amount of heat generation is largest at the ends of the amplification optical fiber 20, and decreases toward the center thereof.

Generally, heat generation at each position on the amplification optical fiber 20 is proportional to the amount of energy of pumping light that passes through the position. Therefore, such a heat generation amount distribution is formed.

That is, a part of pumping light is transformed into heat at each position of the amplification optical fiber 20 due to transmission loss in the amplification optical fiber 20, thereby generating heat in the amplification optical fiber 20. Therefore, the amount of heat generation is approximately proportional to the product of the transmission loss and the amount of energy of pumping light at each position. Since the transmission loss of the amplification optical fiber 20 is substantially constant at any positions thereon, the amount of heat generation is larger at the position at which the amount of energy of pumping light is larger in the amplification optical fiber 20. Since the pumping light enters the both ends of the amplification optical fiber 20 in the present embodiment, the amount of energy of pumping light is largest at the both ends of the amplification optical fiber 20. Then, the pumping light propagates through the amplification optical fiber 20 toward the center thereof. At this point, since a part of the energy of the pumping light is transformed into heat due to the transmission loss of the amplification optical fiber 20, the amount of energy is gradually reduced. The transmission loss of the amplification optical fiber 20 is considerably larger than that of a general communication optical fiber. Therefore, reduction of the amount of energy caused by the propagation of the pumping light is also considerably large. As a result, the difference between the amount of heat generation at the center of the amplification optical fiber 20 and the amount of heat generation at the both ends thereof becomes large.

In the optical amplification component 1 in the present embodiment, the first fiber portion 20A and the second fiber portion 20B are arranged on the heat dissipation surface of the heat dissipation plate 10 in such a manner that the first fiber portion 20A and the second fiber portion 20B are wound in a spiral around the reference position RP so as to be along each other as well as not to overlap with each other, and the distance between the first fiber portion 20A and the second fiber portion 20B increases toward the ends thereof.

Therefore, the both ends of the amplification optical fiber 20 at which the amount of heat generation is largest are located away from each other. Therefore, deterioration of the amplification optical fiber 20, the deterioration being caused by heat generated at the both ends thereof, can be significantly reduced. In this manner, the optical amplification component 1 capable of improving the life of the amplification optical fiber 20 is provided.

In the optical amplification component 1 in the present embodiment, the winding turn distance B1 is provided. Therefore, in comparison with an optical amplification component in which the winding turn distance B1 is not provided, a gap is formed throughout the circumferences of the both ends of the amplification optical fiber 20 at which the amount of heat generation is largest. As a result, deterioration of the amplification optical fiber 20, the deterioration being caused by heat generated at the both ends thereof, can be further significantly reduced. The case where there is no winding turn distance B1 indicates that, when the first fiber portion 20A and the second fiber portion 20B which are bent at the reference position RP as a base point and wound in a spiral around the reference position RP along each other are considered as a pair, an outer pair and an inner pair in a wound state are in contact with each other.

Further, in the optical amplification component 1 in the present embodiment, the winding turn distance B1 increases toward the ends of the first fiber portion 20A and the second fiber portion 20B. Therefore, the gap formed around the both ends of the amplification optical fiber 20 at which the amount of heat generation is largest can be made larger. As a result, deterioration of the amplification optical fiber 20, the deterioration being caused by heat generated at the both ends thereof, can be significantly reduced. Although the winding turn distance B1 increases toward the ends of the first fiber portion 20A and the second fiber portion 20B in the same manner as in the fiber distance B2, the winding turn distance may increase in a different manner from that in the fiber distance B2.

(2) Second Embodiment

Next, the second embodiment will be described in detail with reference to the accompanying drawing. The same or equivalent components as/to those of the first embodiment are denoted by the same reference signs, and an overlapping description will be omitted excepting when a description for such components is particularly necessary.

Figure 4:
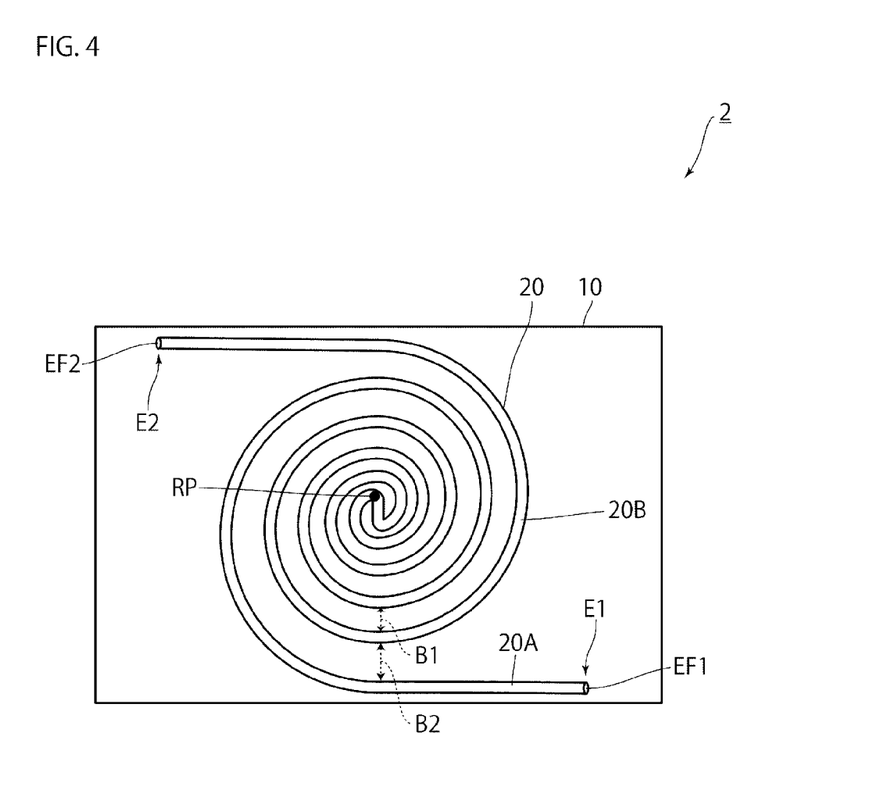
FIG. 4 is a diagram illustrating an optical amplification component in a second embodiment.

FIG. 4 is a diagram illustrating an optical amplification component 2 in the second embodiment. As shown in FIG. 4, in the optical amplification component 2 in the present embodiment, only the arrangement configuration of the end part of the first fiber portion 20A and the end part of the second fiber portion 20B of the amplification optical fiber 20 is different from that of the first embodiment.

Specifically, in the first embodiment, the end part of the first fiber portion 20A and the end part of the second fiber portion 20B are arranged not on different sides, but on the same side with respect to the reference position RP.

On the other hand, in the present embodiment, the end part of the first fiber portion 20A and the end part of the second fiber portion 20B are opposed to each other across the reference position RP. As to the relationship with the heat dissipation plate 10, the end part of the first fiber portion 20A is arranged on one long side of the heat dissipation plate 10, and the end part of the second fiber portion 20B is arranged on the other long side thereof. The reference position RP is located between the end part of the first fiber portion 20A and the end part of the second fiber portion 20B.

In the present embodiment, each of the end part of the first fiber portion 20A and the end part of the second fiber portion 20B extends in a straight line. However, one or both of the end part of the first fiber portion 20A and the end part of the second fiber portion 20B may be warped inward or outward as long as the distance between the first fiber portion 20A and the second fiber portion 20B increases toward the ends thereof.

Although the first end face EF1 of the first fiber portion 20A and the second end face EF2 of the second fiber portion 20B face in exactly opposite directions in the present embodiment, the first end face EF1 and the second end face EF2 may not face in exactly opposite directions.

As described above, in the optical amplification component 2 in the present embodiment, the end part of the first fiber portion 20A and the end part of the second fiber portion 20B are opposed to each other across the reference position RP.

Therefore, in the optical amplification component 2 in the present embodiment, the both ends of the amplification optical fiber 20 at which the amount of heat generation is largest can be symmetrically arranged with respect to the reference position RP. As to the relationship with the heat dissipation plate 10, the both ends of the amplification optical fiber 20 at which the amount of heat generation is largest can be arranged substantially on a diagonal line of the heat dissipation plate 10 across the reference position RP.

Therefore, according to the optical amplification component 2 in the present embodiment, the distance between the both ends of the amplification optical fiber 20 at which the amount of heat generation is largest can be made longer than that in the optical amplification component 1 of the first embodiment. As a result, deterioration of the both ends of the amplification optical fiber 20 and the vicinities thereof due to heat can be further significantly reduced.

(3) Third Embodiment

Next, the third embodiment will be described in detail with reference to the accompanying drawings. The same or equivalent components as/to those of the above embodiments are denoted by the same reference sings, and an overlapping description will be omitted excepting when a description for such components is particularly necessary.

Figure 5:
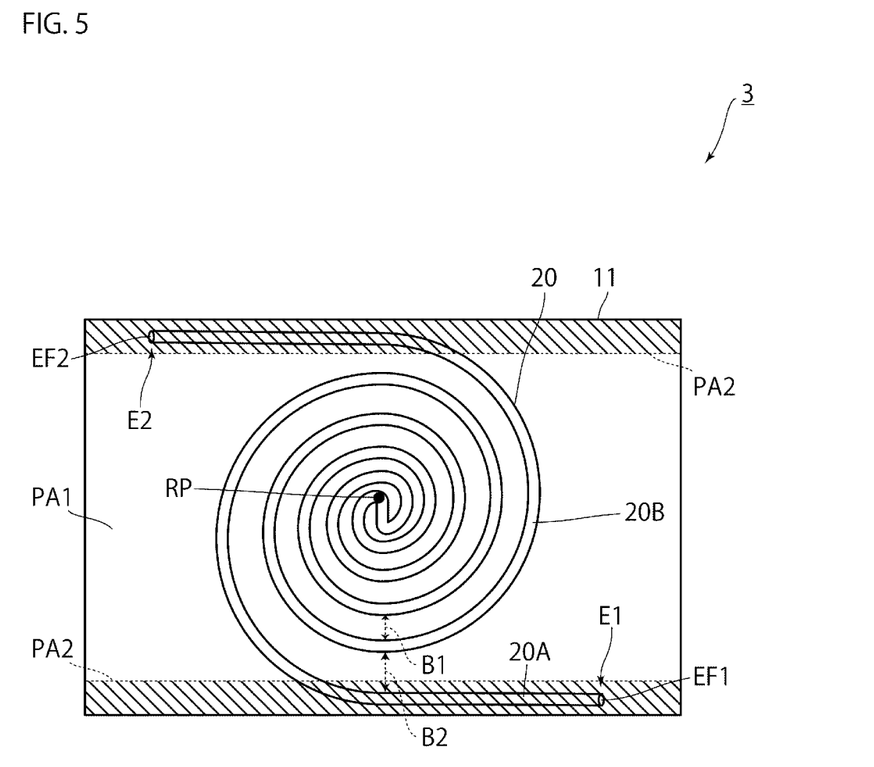
FIG. 5 is a diagram illustrating an optical amplification component in a third embodiment.

FIG. 5 is a diagram illustrating an optical amplification component 3 in the third embodiment. As illustrated in FIG. 5, in the optical amplification component 3 in the present embodiment, only the structure of a heat dissipation plate 11 is different from the structure of the heat dissipation plate 10 of the second embodiment.

Specifically, in the second embodiment, the heat dissipation plate 10 which has substantially the same thermal resistance throughout the entire heat dissipation surface is employed.

On the other hand, the present embodiment employs the heat dissipation plate 11 which includes a first heat dissipation area PA1 and second heat dissipation areas PA2 each having a smaller thermal resistance than the thermal resistance of the first heat dissipation area PA1.

In the present embodiment, the end parts on the respective long sides of the heat dissipation plate 11 are defined as the second heat dissipation areas PA2. The other part of the heat dissipation plate 11 is defined as the first heat dissipation area PA1. The second heat dissipation areas PA2 are parallel to each other along the respective long sides of the heat dissipation plate 11. The widths of the respective second heat dissipation areas PA2 are substantially the same as each other.

The end part of the first fiber portion 20A is arranged in one of the second heat dissipation areas PA2, and the end part of the second fiber portion 20B is arranged in the other second heat dissipation area PA2.

As an example of a method for obtaining the first heat dissipation area PA1 and the second heat dissipation area PA2 having different thermal resistances, the first heat dissipation area PA1 is formed of aluminum, and the second heat dissipation area PA2 is formed of copper which has a smaller thermal resistance than aluminum.

As another example, the heat dissipation surface of the first heat dissipation area PA1 is formed into a flat shape, and a groove that has a curvature substantially equal to the curvature of the outer peripheral surface of the amplification optical fiber 20 is formed on the heat dissipation surface of the second heat dissipation area PA2 to thereby increase the contact area between the surfaces of the both end parts of the amplification optical fiber 20 and the heat dissipation surface.

As another example, convex portions called fins are formed on a surface of the heat dissipation plate 11, the surface being opposite to the heat dissipation surface thereof, at positions corresponding to the first heat dissipation area PA1 and the second heat dissipation area PA2. The length of a convex portion corresponding to the second heat dissipation area PA2 is made longer than the length of a convex portion corresponding to the first heat dissipation area PA1.

As another example, a cooling mechanism of air-cooling type, water-cooling type, or electronic cooling type is provided only in the second heat dissipation area PA2.

As described above, in the optical amplification component 3 in the present embodiment, the end part of the first fiber portion 20A and the end part of the second fiber portion 20B are arranged in the respective second dissipation areas PA2 having a smaller thermal resistance than the first dissipation area PA1.

Therefore, it is possible to intensively cool the both ends of the amplification optical fiber 20 at which the amount of heat generation is largest. As a result, it is possible to reduce deterioration of the amplification optical fiber 20 while more downsizing the heat dissipation plate 11 than the heat dissipation plate 10 which has substantially the same thermal resistance throughout the entire heat dissipation surface thereof.

The sizes and the shapes of the first heat dissipation area PA1 and the second heat dissipation areas PA2 are not limited to those of the present embodiment, and can therefore be appropriately changed. A part of the amplification optical fiber 20 that should be arranged in the second heat dissipation areas PA2 is not limited to the end part thereof, and can therefore be appropriately changed.

Figure 6:
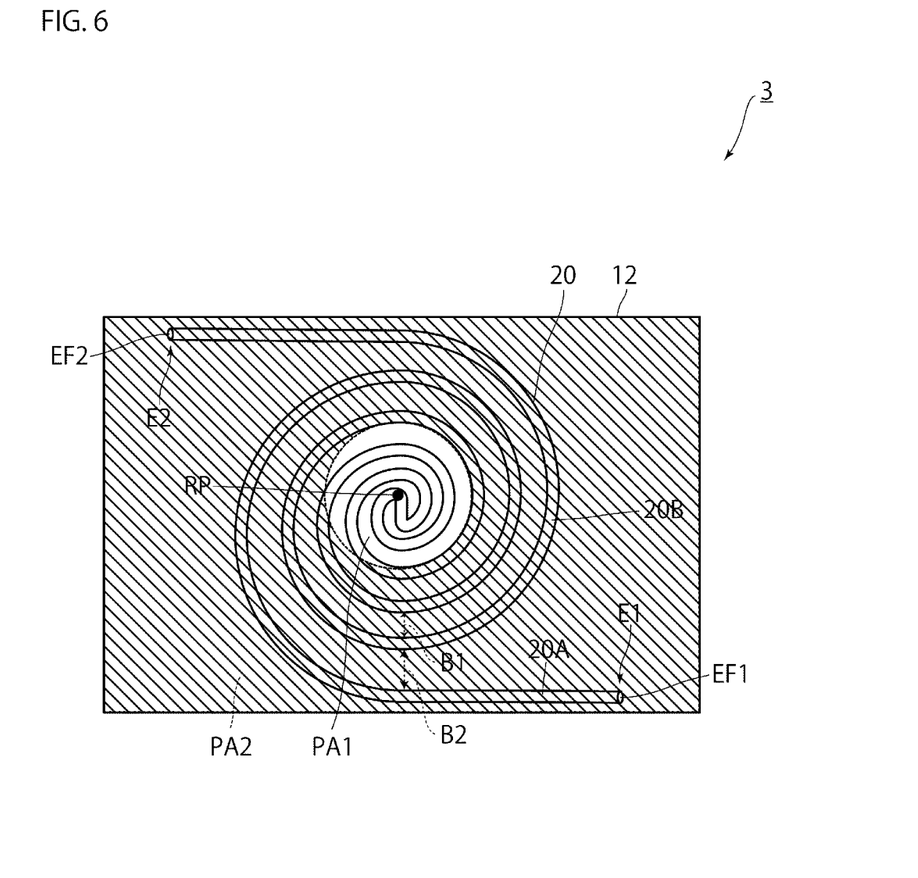
FIG. 6 is a diagram illustrating an example (1) of the structure of the heat dissipation plate.

For example, as shown in FIG. 6, a heat dissipation plate 12 can be employed. In the heat dissipation plate 12, an area corresponding to the reference position RP and the periphery thereof is defined as the first heat dissipation area PA1, and an area other than the first heat dissipation area PA1 is defined as the second dissipation area PA2. A part of the first fiber portion 20A and a part of the second fiber portion 20B other than the reference position RP and the vicinity thereof in the amplification optical fiber 20 are arranged in the second heat dissipation area PA2 in the heat dissipation plate 12.

Figure 7:
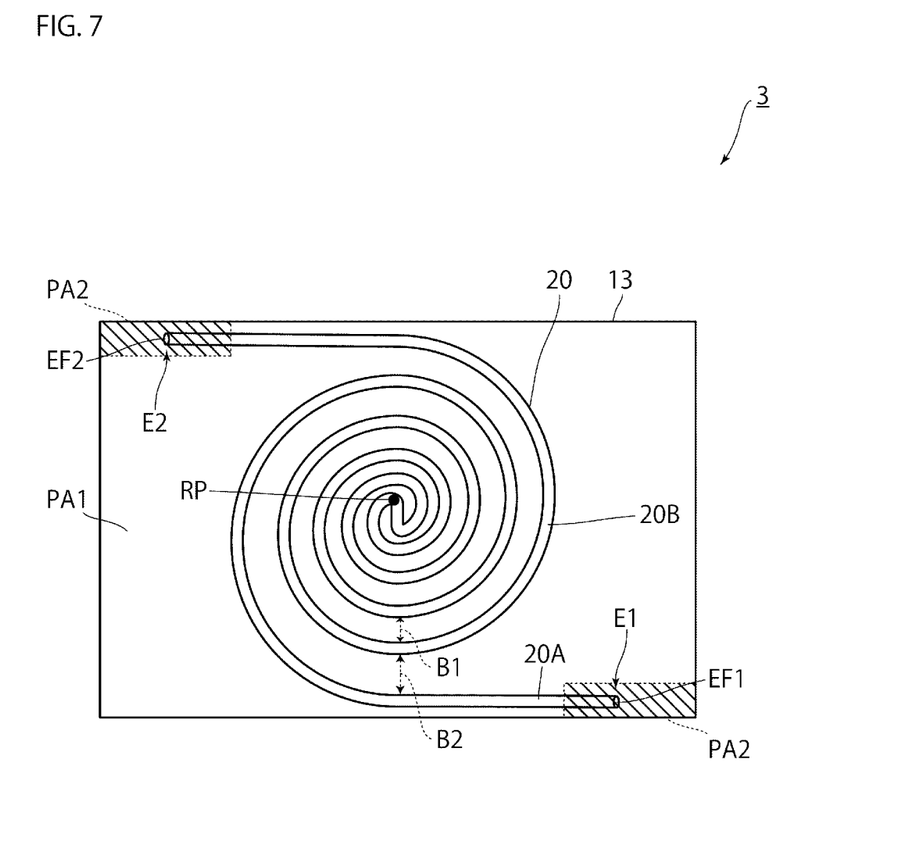
FIG. 7 is a diagram illustrating an example (2) of the structure of the heat dissipation plate.

For example, as shown in FIG. 7, a heat dissipation plate 13 can be employed. In the heat dissipation plate 13, two diagonally opposed corners are defined as the second dissipation areas PA2, and an area other than these corners is defined as the first dissipation area PA1. The end part of the first fiber portion 20A and the end part of the second fiber portion 20B are arranged in the respective second heat dissipation areas PA2 in the heat dissipation plate 12.

Basically, it is only required to employ a heat dissipation plate that includes the first dissipation area and the second dissipation area having a smaller thermal resistance than the first heat dissipation area. Further, it is only required that at least the end part of the first fiber portion 20A and the end part of the second fiber portion 20B are arranged in the second heat dissipation area. Any of the structures of the respective heat dissipation plates 11 to 13 can also be applied to the heat dissipation plate 10 of the first embodiment.

(4) Fourth Embodiment

Next, the fourth embodiment will be described in detail with reference to the accompanying drawings. The same or equivalent components as/to those of the above embodiments are denoted by the same reference sings, and an overlapping description will be omitted excepting when a description for such components is particularly necessary.

Figure 8:
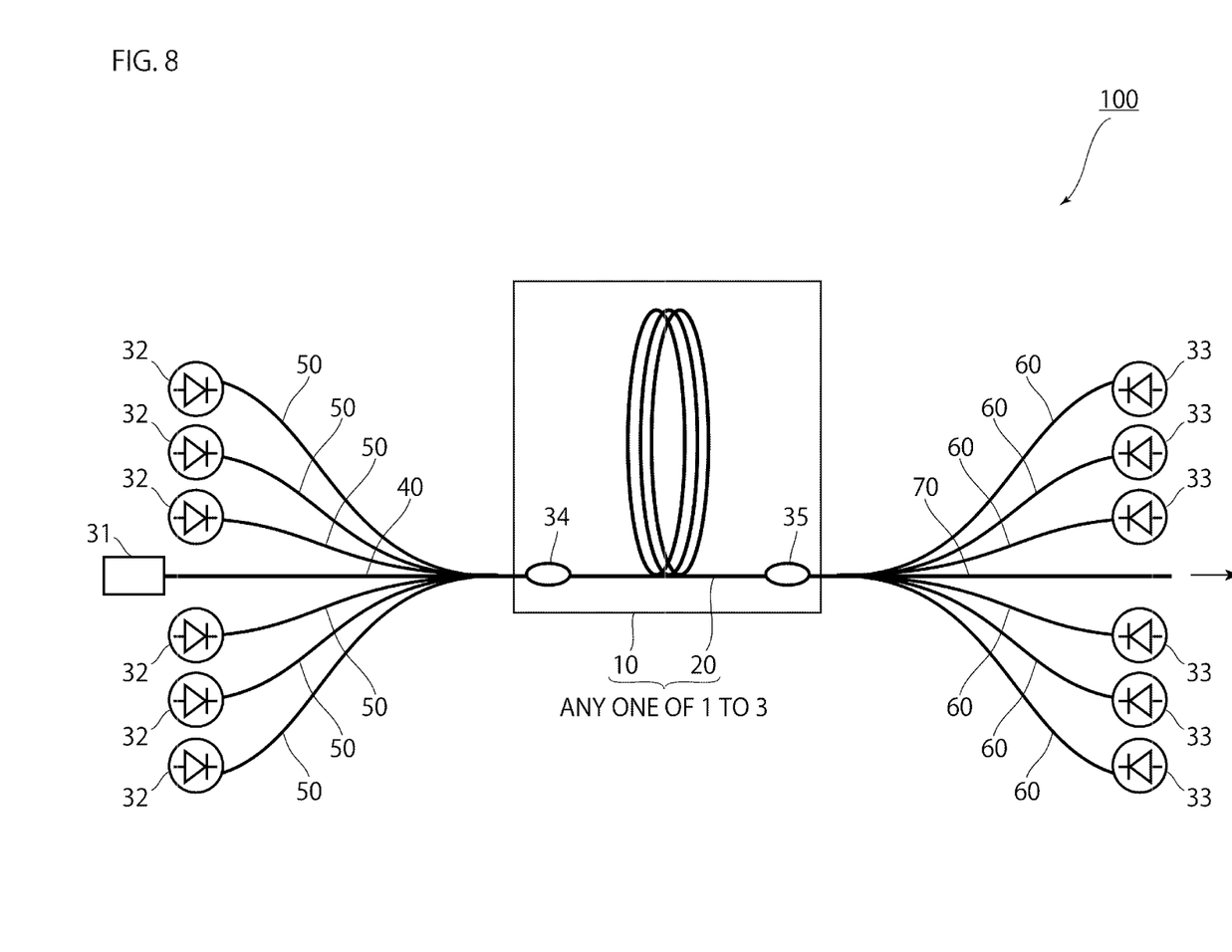
FIG. 8 is a diagram illustrating a fiber laser device in a fourth embodiment.

FIG. 8 is a diagram illustrating a fiber laser device in the fourth embodiment. As illustrated in FIG. 8, a fiber laser device 100 in the present embodiment is a master oscillator power amplifier (MO-PA) type fiber laser device.

The fiber laser device 100 includes, as main components, any one of the optical amplification components 1 to 3 in the first to third embodiments, a seed light source 31, a plurality of first pumping light sources 32, a plurality of second pumping light source 33, an input side optical coupler 34, and an output side optical coupler 35. The arrangement state of the amplification optical fiber 20 in FIG. 8 is illustrated for descriptive purpose, and is therefore different from the arrangement state illustrated in each of FIG. 1 and FIGS. 4 to 7.

The seed light source 31 emits seed light. The seed light source 31 is, for example, a laser light source that includes a laser diode, or a Fabry-Perot type or fiber ring type laser light source.

The first pumping light sources 32 and the second pumping light sources 33 emit pumping light, and are, for example, laser diodes.

The input side optical coupler 34 inputs seed light emitted from the seed light source 31 to the core 21 of the amplification optical fiber 20 at the first end E1 thereof, and also inputs pumping light emitted from the first pumping light sources 32 to the first cladding 22 of the amplification optical fiber 20 at the first end E1 thereof.

In the present embodiment, the seed light emitted from the seed light source 31 enters the input side optical coupler 34 through an input optical fiber 40. The input optical fiber 40 is, for example, a single mode fiber. One end of a core of the input optical fiber 40 is optically coupled to the seed light source 31, and the other end of the core of the input optical fiber 40 is optically coupled to the core 21 of the amplification optical fiber 20 through the input side optical coupler 34.

The pumping light emitted from the first pumping light sources 32 enters the input side optical coupler 34 through pumping light input fibers 50. The pumping light input fibers 50 are, for example, multimode fibers. The number of the pumping light input fibers 50 is the same as the number of the first pumping light sources 32. One end of a core of each of the pumping light input fibers 50 is optically coupled to each of the first pumping light sources 32, and the other end of the core of each of the pumping light input fibers 50 is optically coupled to the first cladding 22 of the amplification optical fiber 20 through the input side optical coupler 34.

The output side optical coupler 35 inputs pumping light emitted from the second pumping light sources 33 to the first cladding 22 of the amplification optical fiber 20 at the second end E2 thereof, and also outputs the seed light that propagates through the core 21 of the amplification optical fiber 20 to the outside from the second end E2.

In the present embodiment, the pumping light emitted from the second pumping light sources 33 enters the output side optical coupler 35 through pumping light input fibers 60. The pumping light input fibers 60 are, for example, multimode fibers. The number of the pumping light input fibers 60 is the same as the number of the second pumping light sources 33. One end of a core of each of the pumping light input fibers 60 is optically coupled to each of the second pumping light sources 33, and the other end of the core of each of the pumping light input fibers 60 is optically coupled to the first cladding 22 of the amplification optical fiber 20 through the output side optical coupler 35.

Further, the core 21 of the amplification optical fiber 20 is optically coupled to one end of a core of an output optical fiber 70 through the output side optical coupler 35. The output optical fiber 70 is, for example, a single mode fiber.

In the fiber laser device 100 of the present embodiment, when seed light is input to the core 21 of the amplification optical fiber 20 at the first end E1 thereof, the input seed light propagates through the core 21 from the first end E1 toward the second end E2 of the amplification optical fiber 20.

On the other hand, when pumping light is input to the first cladding 22 of the amplification optical fiber 20 at the first end E1 thereof, the input pumping light propagates through the first cladding 22 and the core 21 from the first end E1 toward the second end E2 of the amplification optical fiber 20.

Further, when pumping light is input to the first cladding 22 of the amplification optical fiber 20 at the second end E2 thereof, the input pumping light propagates through the first cladding 22 and the core 21 from the second end E2 toward the first end E1 of the amplification optical fiber 20.

The active element which is added to the core 21 is pumped by the pumping light that propagates through the first cladding 22 and the core 21. The active element in a pumped state induces stimulated emission by the seed light that propagates through the core 21. The seed light is amplified due to the stimulated emission. The amplified seed light is output to the output optical fiber 70 from the second end E2 of the amplification optical fiber 20 by the output side optical coupler 35.

Also when any one of the optical amplification components 1 to 3 of the first to third embodiments is used as one of the components of such a fiber laser device 100, deterioration of the amplification optical fiber 20, the deterioration being caused by heat generated at the both ends thereof, can be significantly reduced. In this manner, the fiber laser device 100 capable of improving the life of the amplification optical fiber 20 is provided.

(5) Fifth Embodiment

Next, the fifth embodiment will be described in detail with reference to the accompanying drawings. The same or equivalent components as/to those of the above embodiments are denoted by the same reference sings, and an overlapping description will be omitted excepting when a description for such components is particularly necessary.

Figure 9:
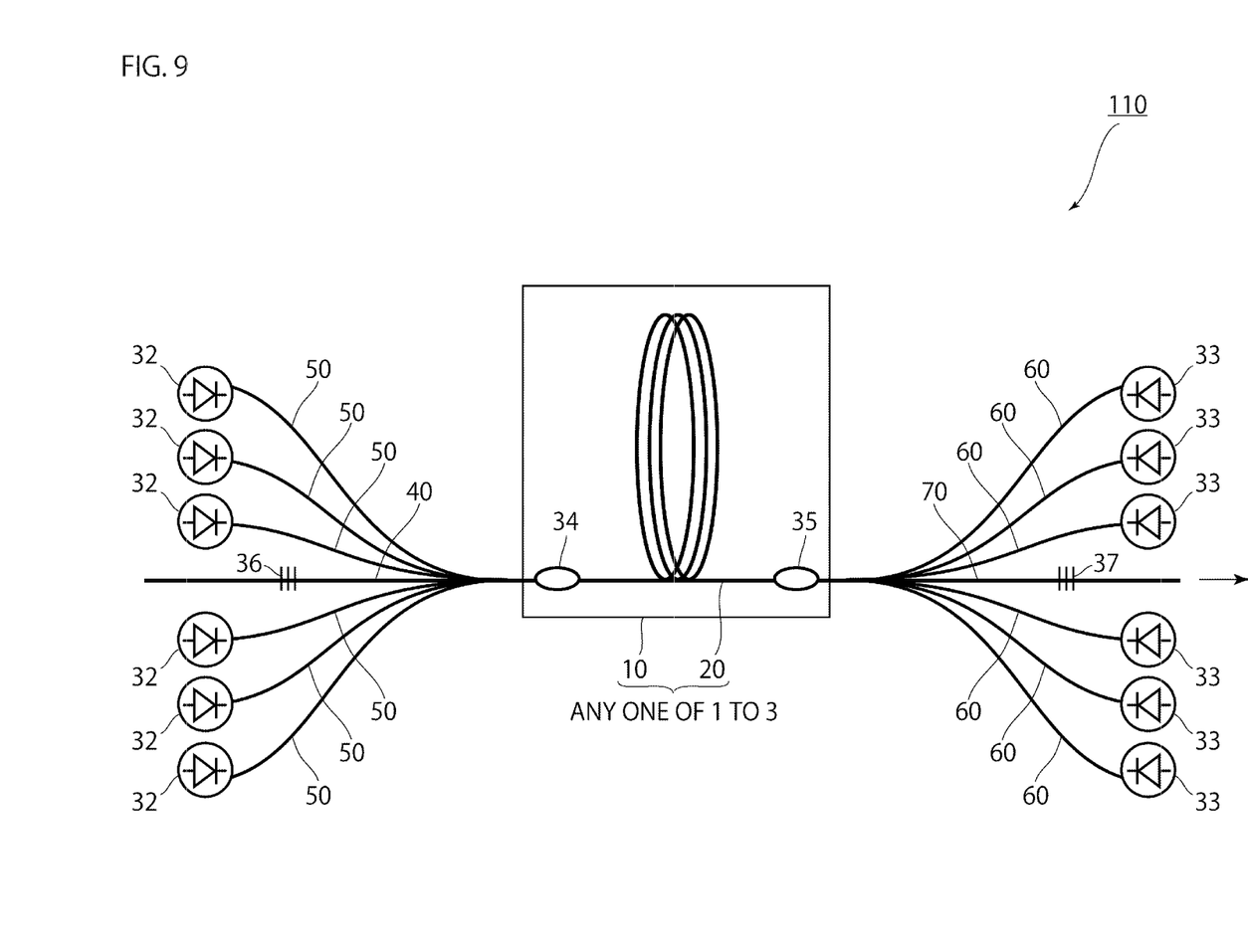
FIG. 9 is a diagram illustrating a fiber laser device in a fifth embodiment.

FIG. 9 is a diagram illustrating a fiber laser device in the fifth embodiment. As illustrated in FIG. 9, a fiber laser device 110 of the present embodiment is a resonance type fiber laser device. The arrangement state of the amplification optical fiber 20 in FIG. 9 is illustrated for descriptive purpose, and is therefore different from the arrangement state illustrated in each of FIG. 1 and FIGS. 4 to 7.

The fiber laser device 110 includes, as main components, any one of the optical amplification components 1 to 3 in the first to third embodiments, a plurality of first pumping light sources 32, a plurality of second pumping light source 33, an input side optical coupler 34, an output side optical coupler 35, a first fiber Bragg grating (FBG) 36 as a first mirror, and a second fiber Bragg grating (FBG) 37 as a second mirror.

The first FBG 36 is provided in an input optical fiber 40, and has a structure in which portions with a high refractive index are formed along the longitudinal direction of the amplification optical fiber 20 at regular intervals. The first FBG 36 is adjusted so as to reflect at least a part of light emitted from the active element of the amplification optical fiber 20 in a pumped state, the part of light having some wavelengths.

The second FBG 37 is provided in an output optical fiber 70, and has a structure in which portions with a high refractive index are formed along the longitudinal direction of the amplification optical fiber 20 at regular intervals. The second FBG 37 is adjusted so as to reflect light having the same wavelengths as the light reflected by the first FBG 36 with a lower reflectivity than the first FBG 36.

In the fiber laser device 110 of the present embodiment, pumping light that has entered the first cladding 22 of the amplification optical fiber 20 propagates through the first cladding 22 and the core 21 of the amplification optical fiber 20. The active element which is added to the core 21 is pumped by the pumping light, and light having a specific wavelength is thereby emitted from the active element.

The light emitted from the active element propagates through the core 21 of the amplification optical fiber 20. The light having a specific wavelength moves back and forth between the first FBG 36 and the second FBG 37, and is amplified. A part of the amplified light passes through the second FBG 37, and is emitted from the output end of the amplification optical fiber 20 to the output optical fiber 70.

Also when any one of the optical amplification components 1 to 3 of the first to third embodiments is used as one of the components of such a fiber laser device 110, deterioration of the amplification optical fiber 20, the deterioration being caused by heat generated at the both ends thereof, can be significantly reduced. In this manner, the fiber laser device 110 capable of improving the life of the amplification optical fiber 20 is provided.

(6) Modifications

Although the first to fifth embodiments have been described above as examples, the present invention is not limited to the above embodiments.

For example, in the first to third embodiments, when the first fiber portion 20A and the second fiber portion 20B which are bent at the reference position RP as a base point and wound in a spiral around the reference position RP along each other are considered as a pair, an outer pair and an inner pair are wound in a spiral with the winding turn distance B1 therebetween. However, the outer pair and the inner pair are not necessarily wound in a spiral with the winding turn distance B1 therebetween as long as the distance between the first fiber portion 20A and the second fiber portion 20B which together form a pair increases toward the ends thereof.

In addition to the above embodiments and modifications, combination, omission, modification, and addition of a known technique can be appropriately performed with respect to the respective components of the optical amplification components 1 to 3, the fiber laser device 100 and the fiber laser device 110 without departing from the scope of the present invention.

The invention claimed is:

1. An optical amplification component comprising:
a heat dissipation plate; and
an amplification optical fiber arranged on the heat dissipation plate,
wherein the amplification optical fiber comprises a first fiber portion extending from a reference position between a first end and a second end of the amplification optical fiber toward the first end and a second fiber portion extending from the reference position toward the second end,
wherein the amplification optical fiber comprises a wound portion in which both of the first fiber portion and the second fiber portion are curved in a spiral around the reference position so as to be along each other as well as not to overlap with each other, and the distance between the first fiber portion and the second fiber portion increases toward the first and second ends thereof in the wound portion.

2. The optical amplification component according to claim 1, wherein when the first fiber portion and the second fiber portion are considered as a pair, an outer pair and an inner pair in a wound state are separated from each other.

3. The optical amplification component according to claim 2, wherein the distance between the outer pair and the inner pair increases toward the ends of the first fiber portion and the second fiber portion.

4. The optical amplification component according to claim 1, wherein an end part of the first fiber portion and an end part of the second fiber portion are opposed to each other across the reference position.

5. The optical amplification component according to claim 1, wherein the heat dissipation plate includes a first heat dissipation area and a second heat dissipation area having a smaller thermal resistance than the thermal resistance of the first heat dissipation area, and the end part of the first fiber portion and the end part of the second fiber portion are arranged in the second heat dissipation area.

6. A fiber laser device comprising:
the optical amplification component according to claim 1;
a seed light source;
a first pumping light source;
a second pumping light source;
an input side optical coupler inputting seed light emitted from the seed light source to a core of the amplification optical fiber at the first end of the amplification optical fiber and inputting pumping light emitted from the first pumping light source to a cladding of the amplification optical fiber at the first end of the amplification optical fiber; and
an output side optical coupler inputting pumping light emitted from the second pumping light source to the second end of the amplification optical fiber and outputting seed light propagating through the core of the amplification optical fiber to the outside.

7. A fiber laser device comprising:
the optical amplification component according to claim 1;
a first pumping light source;
a second pumping light source;
an input side optical coupler inputting pumping light emitted from the first pumping light source to a cladding of the amplification optical fiber at the first end of the amplification optical fiber;
an output side optical coupler inputting pumping light emitted from the second pumping light source to the second end of the amplification optical fiber;
a first mirror reflecting at least a part of light emitted from an active element added to a core of the amplification optical fiber; and
a second mirror reflecting light reflected by the first mirror with a lower reflectivity than the first mirror.

8. A fiber laser device comprising:
the optical amplification component according to claim 2;
a seed light source;
a first pumping light source;
a second pumping light source;
an input side optical coupler inputting seed light emitted from the seed light source to a core of the amplification optical fiber at the first end of the amplification optical fiber and inputting pumping light emitted from the first pumping light source to a cladding of the amplification optical fiber at the first end of the amplification optical fiber; and
an output side optical coupler inputting pumping light emitted from the second pumping light source to the second end of the amplification optical fiber and outputting seed light propagating through the core of the amplification optical fiber to the outside.

9. A fiber laser device comprising:
the optical amplification component according to claim 3;
a seed light source;
a first pumping light source;
a second pumping light source;

an input side optical coupler inputting seed light emitted from the seed light source to a core of the amplification optical fiber at the first end of the amplification optical fiber and inputting pumping light emitted from the first pumping light source to a cladding of the amplification optical fiber at the first end of the amplification optical fiber; and an output side optical coupler inputting pumping light emitted from the second pumping light source to the second end of the amplification optical fiber and outputting seed light propagating through the core of the amplification optical fiber to the outside.

10. A fiber laser device comprising:
the optical amplification component according to claim 4;
a seed light source;
a first pumping light source;
a second pumping light source;
an input side optical coupler inputting seed light emitted from the seed light source to a core of the amplification optical fiber at the first end of the amplification optical fiber and inputting pumping light emitted from the first pumping light source to a cladding of the amplification optical fiber at the first end of the amplification optical fiber; and
an output side optical coupler inputting pumping light emitted from the second pumping light source to the second end of the amplification optical fiber and outputting seed light propagating through the core of the amplification optical fiber to the outside.

11. A fiber laser device comprising:
the optical amplification component according to claim 5;
a seed light source;
a first pumping light source;
a second pumping light source;
an input side optical coupler inputting seed light emitted from the seed light source to a core of the amplification optical fiber at the first end of the amplification optical fiber and inputting pumping light emitted from the first pumping light source to a cladding of the amplification optical fiber at the first end of the amplification optical fiber; and
an output side optical coupler inputting pumping light emitted from the second pumping light source to the second end of the amplification optical fiber and outputting seed light propagating through the core of the amplification optical fiber to the outside.

12. A fiber laser device comprising:
the optical amplification component according to claim 2;
a first pumping light source;
a second pumping light source;
an input side optical coupler inputting pumping light emitted from the first pumping light source to a cladding of the amplification optical fiber at the first end of the amplification optical fiber;
an output side optical coupler inputting pumping light emitted from the second pumping light source to the second end of the amplification optical fiber;
a first mirror reflecting at least a part of light emitted from an active element added to a core of the amplification optical fiber; and
a second mirror reflecting light reflected by the first mirror with a lower reflectivity than the first mirror.

13. A fiber laser device comprising:
the optical amplification component according to claim 3;
a first pumping light source;
a second pumping light source;
an input side optical coupler inputting pumping light emitted from the first pumping light source to a cladding of the amplification optical fiber at the first end of the amplification optical fiber;
an output side optical coupler inputting pumping light emitted from the second pumping light source to the second end of the amplification optical fiber;
a first mirror reflecting at least a part of light emitted from an active element added to a core of the amplification optical fiber; and
a second mirror reflecting light reflected by the first mirror with a lower reflectivity than the first mirror.

14. A fiber laser device comprising:
the optical amplification component according to claim 4;
a first pumping light source;
a second pumping light source;
an input side optical coupler inputting pumping light emitted from the first pumping light source to a cladding of the amplification optical fiber at the first end of the amplification optical fiber;
an output side optical coupler inputting pumping light emitted from the second pumping light source to the second end of the amplification optical fiber;
a first mirror reflecting at least a part of light emitted from an active element added to a core of the amplification optical fiber; and
a second mirror reflecting light reflected by the first mirror with a lower reflectivity than the first mirror.

15. A fiber laser device comprising:
the optical amplification component according to claim 5;
a first pumping light source;
a second pumping light source;
an input side optical coupler inputting pumping light emitted from the first pumping light source to a cladding of the amplification optical fiber at the first end of the amplification optical fiber;
an output side optical coupler inputting pumping light emitted from the second pumping light source to the second end of the amplification optical fiber;
a first mirror reflecting at least a part of light emitted from an active element added to a core of the amplification optical fiber; and
a second mirror reflecting light reflected by the first mirror with a lower reflectivity than the first mirror.

16. The optical amplification component according to claim 1, wherein the distance between the first fiber portion and the second fiber portion increases toward the first and second ends thereof throughout the wound portion.

* * * * *